United States Patent
Anderson et al.

(10) Patent No.: US 8,303,048 B2
(45) Date of Patent: Nov. 6, 2012

(54) BRAKING CONTROL SYSTEM COMPRISING A PRESSURE-CONTROL SIMULATOR

(75) Inventors: Chris Anderson, Paris (FR); Raynald Sprocq, Esbly (FR)

(73) Assignee: Robert Bosch GmbH, Stuttgart (DE)

( * ) Notice: Subject to any disclaimer, the term of this patent is extended or adjusted under 35 U.S.C. 154(b) by 1125 days.

(21) Appl. No.: 12/160,436

(22) PCT Filed: Jan. 8, 2007

(86) PCT No.: PCT/EP2007/050155
§ 371 (c)(1),
(2), (4) Date: Jul. 10, 2008

(87) PCT Pub. No.: WO2007/080158
PCT Pub. Date: Jul. 19, 2007

(65) Prior Publication Data
US 2010/0269683 A1    Oct. 28, 2010

(51) Int. Cl.
*B60T 8/44* (2006.01)
*B60T 13/20* (2006.01)
(52) U.S. Cl. .......... 303/114.3; 303/114.1; 303/114.2; 303/115.2; 303/115.1; 60/556
(58) Field of Classification Search .... 303/114.1–114.3, 303/115.1, 115.2; 60/552, 553, 555, 556
See application file for complete search history.

(56) References Cited

U.S. PATENT DOCUMENTS

| | | | | |
|---|---|---|---|---|
| 2,879,645 A * | 3/1959 | Ingres | | 60/556 |
| 3,638,425 A * | 2/1972 | Maurice | | 60/552 |
| 3,683,619 A * | 8/1972 | Belart | | 60/549 |
| 3,871,497 A * | 3/1975 | Bessiere | | 477/202 |
| 4,659,153 A * | 4/1987 | Klein | | 303/114.3 |
| 4,787,685 A * | 11/1988 | Klein | | 303/114.3 |
| 5,046,314 A * | 9/1991 | Levrai | | 60/555 |
| 6,425,644 B2 * | 7/2002 | Kawahata et al. | | 303/122 |
| 6,533,366 B1 * | 3/2003 | Barron et al. | | 303/113.1 |
| 2006/0163941 A1 | 7/2006 | Von Hayn et al. | | |

FOREIGN PATENT DOCUMENTS

| | | |
|---|---|---|
| DE | 19750977 A1 | 6/1999 |
| DE | 102004005107 A1 | 8/2005 |
| GB | 2200419 A * | 8/1988 |

OTHER PUBLICATIONS

PCT/EP2007/050155 International Search Report.

\* cited by examiner

*Primary Examiner* — Bradley King
*Assistant Examiner* — Mahbubur Rashid
(74) *Attorney, Agent, or Firm* — Michael Best & Friedrich LLP

(57) ABSTRACT

The invention relates to a brake control system for motor vehicles and, in particular, to a hydraulic control system. The invention also applies to hybrid braking systems such as those provided in hybrid vehicles (vehicles propelled electrically and propelled using internal combustion engines) comprising a hydraulically operating braking system which comprises a simulator (3) not mechanically coupled to the brake booster piston (42) and an electric braking system using the electric propulsion motor or motors as electric generators.

18 Claims, 12 Drawing Sheets

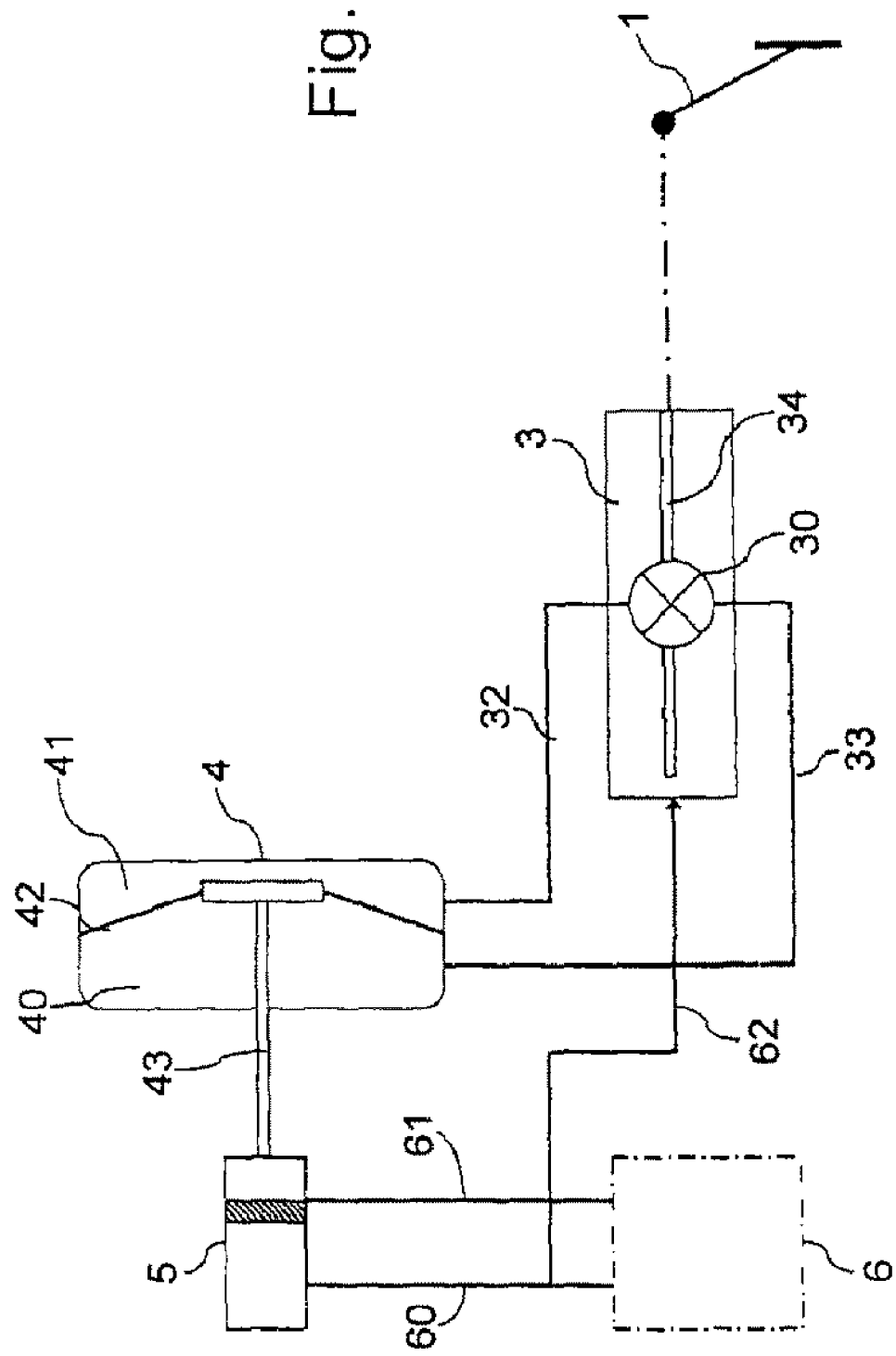

BRAKING CONTROL SYSTEM COMPRISING A PRESSURE-CONTROL SIMULATOR

BACKGROUND OF THE INVENTION

The invention relates to a brake control system for motor vehicles and, in particular, to a hydraulic control system. The invention also applies to hybrid braking systems such as those provided in hybrid vehicles (vehicles propelled electrically and propelled using internal combustion engines) comprising a hydraulically operating braking system and an electric braking system using the electric propulsion motor or motors as electric generators.

In the prior art of motor vehicle hydraulic braking systems, a brake booster essentially comprises a space comprising two chambers (the front chamber or vacuum chamber and the rear chamber or working chamber) which are separated by a moving membrane secured to a piston. A control rod can move towards the front of the vehicle when the driver of the vehicle operates the brake pedal. This movement of the control rod is passed on to a plunger which actuates boost means and the booster piston. In general, these boost means comprise a three-way valve, actuation of which is able to interrupt communication between the vacuum chamber and the working chamber of the booster and to connect the latter chamber to the ambient atmosphere. Given that the vacuum chamber is normally under vacuum, and because of the pressure difference between the two chambers, a boost force is applied to the piston separating the two chambers. The piston therefore moves forwards, acting on a push rod that serves to actuate the master cylinder of the braking circuit.

The control rod which is actuated by the brake pedal is in contact with the piston of the booster, which is in contact with the push rod which acts on the piston of the master cylinder. The various parts that couple the brake pedal to the master cylinder piston are therefore in contact with one another. The driver therefore feels the reaction of the braking circuit through the brake pedal.

However, if a device on the vehicle displaces some brake fluid from some point in the braking circuit towards the master cylinder then there will be a reaction on the brake pedal and this reaction will be felt by the driver. For example, under braking that would have a tendency to lock up the wheels of the vehicle, the antilock braking system (ABS) has the task of reducing the braking effort and in order to do so of extracting brake fluid from the wheel cylinders and injecting it into the master cylinder. Alternatively, in electronic stability programs (ESP) that provide dynamic course control, a hydraulic unit is capable of acting on one or more braking circuits independently of the brake command and this action is also felt at the brake pedal and, if the driver is braking when the ESP cuts in, he will experience a variation in the feel of the brakes which will not necessarily correspond to the feel to which he is accustomed.

It should also be pointed out that because the effect of the hydraulic unit injecting brake fluid into the braking circuit is to move back the pistons of the master cylinder, it also has the effect of causing the brake pedal to move back. If this occurs at the very moment that the driver is exerting a relatively high braking force, then the backward movement of the brake pedal is absorbed by the driver's ankle and this may, at the very least, prove to be unpleasant for the driver. In addition, a backward movement of the master cylinder pistons may even result in bodily injury (for example may break the driver's ankle for example) in an accident, particularly a frontal impact, that occurs while the driver is applying a strong pressure to the brake pedal.

It may therefore prove beneficial for the onward transmission of all these effects that are brought about in the braking circuits and/or in the master cylinder, towards the brake pedal, to be lessened, (if not eliminated or absorbed).

One way to resolve these disadvantages is to provide electrical control of the control system and to provide a system which applies to the brake pedal mechanical commands that simulate the feel of the brakes that the driver is accustomed to feeling with a conventional braking system under the same braking conditions. In the remainder of the description, this device will be termed a "brake feel simulator". In a system such as this, the actual braking devices are therefore disconnected from the brake feel simulator which in response to the braking applies effects to the brake pedal.

However, such systems are expensive by comparison with conventional hydraulic braking systems. Introducing electrical controls and connections generally presents problems with reliability. These systems are therefore even more expensive if they are subjected to the same reliability and safety requirements as conventional hydraulic systems.

Furthermore, so-called hybrid vehicles which have both an electric propulsion motor powered by batteries for propelling the vehicle and an internal combustion engine (running on gasoline, diesel oil, gas or any other fuel) are generally equipped with electric brakes in which braking is obtained by inductive braking with the recuperation of energy from the electric propulsion motor of the vehicle. The electric propulsion motor then acts as an electric generator, the electrical energy recuperated being used to recharge the batteries, something which is advantageous in the use of the vehicle.

In these systems, it is also possible to vary the electric braking torque. Under braking, the maximum amount of electric braking is not always therefore applied. This may for example be the case when use is being made of a radar providing information on the road condition, or when operating the brake pedal somewhat quickly (for example when braking hard and then releasing the brake pedal).

Provision may also be made for an opposite current to be transmitted to the electric motor either for safety reasons or for reasons associated with the feel of the brake pedal.

However, electric braking is not entirely satisfactory. FIG. 1 schematically in continuous line shows a braking curve (braking torque as a function of time) of an electric braking system such as this alone. This same graph also shows, in dotted line, the speed of the vehicle. In a first braking region A, the braking increases progressively until it reaches full effectiveness in a second braking region B, then, as the vehicle speed becomes low, in a third region C, the braking torque decreases and becomes practically non-existent in a fourth region D. A braking system as this is imperfect because in region A braking does not become fully effectively quickly and because in regions C and D the braking effect diminishes when the vehicle is at low speed. Operation such as this is depicted in FIG. 1 by the curve in dotted line.

To remedy this disadvantage of recuperative electric braking, it is necessary for a hydraulic braking system to provide supplementary braking in regions A, C and D.

FIG. 2 shows curves of the operation of the electric braking system and of the hydraulic braking system.

Curve C1 is the recuperative electric braking curve which corresponds to that of FIG. 1. If a vehicle deceleration of 0.7 g for example is desired, and the electric braking system is capable of achieving a maximum deceleration of 0.3 g, then the braking curve applied by the hydraulic braking system needs to be schematically that represented by curve C2. In region A, the hydraulic braking torque will achieve a deceleration of 0.7 g as quickly as possible and will then decrease until the electric braking torque reaches its maximum value and the equivalent deceleration due to this electric braking torque is 0.3 g. In this way, at every moment the sum of the torques supplied by the electric and hydraulic braking systems provides a deceleration of 0.7 g. In region B, the hydraulic braking system supplements the electric braking system in order also to obtain a deceleration of 0.7 g. Thereafter, in region C, the braking torque of the hydraulic system is increased in order once again to provide supplementary braking to the electric braking system and, in region D1, to remedy the fact that electric braking torque is practically nonexistent.

Furthermore, disregarding the response times of the recuperative electric braking system, this system is not able always to respond in the same way because the load on the recuperative braking circuit may vary. This is particularly true when the recuperative circuit essentially includes the vehicle batteries. In such a case, the load can vary according to the state of the batteries.

In such systems, a control circuit, for example a computer, has to manage the operation of the braking systems. This computer is called into operation for each braking action. It has been found that electrically controlled systems are vulnerable whereas hydraulically controlled systems using brake boosters are proven and remain less expensive than electrically controlled systems.

SUMMARY OF THE INVENTION

The invention therefore relates to a braking system capable of solving these problems and advantageously to a braking system in which the devices for braking the wheels of the vehicle are actuated hydraulically. In addition, this system will be able to decouple the brake pedal from the effects brought about in the vehicle braking circuits by the various vehicle systems such as the antilock braking system (ABS) or the electronic stability program (ESP) but will pass on to the brake pedal effects that simulate the feeling of braking.

The invention therefore relates to a brake control system for a motor vehicle comprising
  a brake pedal,
  a brake booster which comprises a front chamber and a rear chamber which are separated by a piston, the said booster supplying an amplified braking command dependent on the pressure difference between the two said chambers,
  a brake master cylinder receiving the amplified braking commands from the brake booster.

According to the invention, the braking system advantageously comprises a simulator not mechanically coupled to the piston of the brake booster chiefly during normal operation (that is to say when there is no failure). This simulator is intended to receive at least one braking command from the brake pedal and in return establishes or controls a pressure difference between the front chamber and the rear chamber of the brake booster so as to control the movement of the booster piston. Advantageously, the simulator is a pneumatic simulator.

According to one preferred embodiment of the invention, the said brake booster does not have a piston equipped with a three-way valve secured to the booster piston.

Thus, according to the invention, the three-way valve is fixed, that is to say it not mechanically driven by the moving parts comprising the control rod, the pneumatic piston and the push rod.

The device according to the invention comprises support means secured directly or indirectly to the stationary part of the pneumatic brake booster.

A hydraulic piston of a three-way control valve is subjected to two opposing actions, firstly the braking command from a hydraulic simulator and secondly a reaction force exerted by an elastic element preferably constrained between the said hydraulic piston and a sensor sensing the ingress of air or of liquid into a pneumatic and/or hydraulic brake booster.

In this case, provision will preferably be made for the elasticity of the said elastic braking simulating element to be set up so that a force simulating braking force can be transmitted to the brake pedal.

According to a preferred embodiment of the invention, the said elastic braking simulating element is a spring.

Furthermore, provision may be made for the said hydraulic simulator to comprise a three-way valve capable of:
  placing the rear chamber in communication with the front chamber,
  or of isolating the rear chamber from the front chamber,
  or placing the rear chamber in communication with a pressure source that establishes a pressure difference between the front chamber and the rear chamber.

There will also advantageously be a hydraulic connection between, firstly, the inside of the master cylinder and/or any point on the hydraulic circuit of the vehicle and, secondly, the hydraulic simulator so that forces corresponding to variations in pressure in the master cylinder and/or the said hydraulic circuit can be passed on to the brake pedal.

Regarding the three-way valve, provision will be made for it to comprise a sensor able to move under the action of the said control piston, a valve shutter able to move under the action of the sensor, and a fixed valve seat against which the valve shutter can bear.

According to an alternative form of embodiment of the invention, the system comprises an intermediate hydraulic control device controlled by the brake pedal and passing on braking forces by generating pressures in a hydraulic circuit so as to control the movement of the control piston of the hydraulic simulator.

Provision may also be made for the brake pedal to act directly on the control piston in order to control the movement thereof.

According to another alternative form of embodiment of the system of the invention, the intermediate hydraulic control device is fixed or is incorporated into the brake booster. Furthermore, it comprises a control rod positioned along the axis of the brake booster. This control rod is controlled by the brake pedal and is capable, particularly in the event of failure and/or rapid actuation of the brake pedal, of pressing directly or indirectly on the brake booster piston.

According to another alternative form of embodiment of the system of the invention, the said hydraulic simulator is fixed to or incorporated into the booster in such a way that one port of the three-way valve communicates with the front chamber and another port communicates with the rear chamber.

Provision may then advantageously be made for the said hydraulic simulator to be positioned along the axis of the brake booster.

It is also possible to contrive for the said control piston to be mechanically coupled to the brake pedal.

Advantageously, the hydraulic simulator can move axially under the control of the brake pedal and control the movement of the booster piston.

According to another alternative form of embodiment, the hydraulic simulator has an axis of movement of the sensor. The said axis is capable of pressing axially on the booster piston or on a pressing rod to control the movement of a master cylinder piston.

Provision will also advantageously be made for the said control piston to move in a fluid-filled space.

Provision may then be made for the said control piston to move in a space supplied with brake fluid via a valve from a vehicle brake fluid reservoir.

The said space may also contain the said elastic element.

BRIEF DESCRIPTION OF THE DRAWINGS

The various objects and features of the invention will become more clearly apparent from the following description given by way of example in conjunction with the attached figures which depict:

FIG. 3: one overall exemplary embodiment of the brake circuit control system according to the invention, FIGS. 7b and 7c: operating states of the system of FIG. 7a, FIGS. 8a and 8b: alternative forms of embodiment of the system of FIG. 7a.

DETAILED DESCRIPTION

Figure 1:
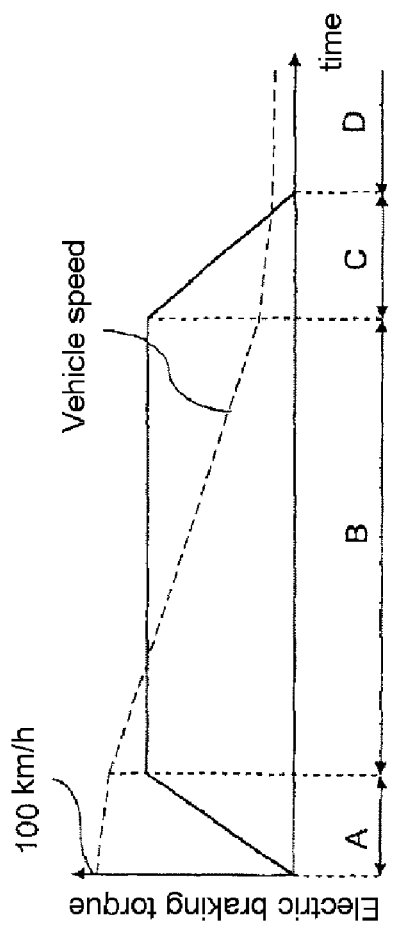
FIGS. 1 and 2: operating curves already described previously.
Figure 2:
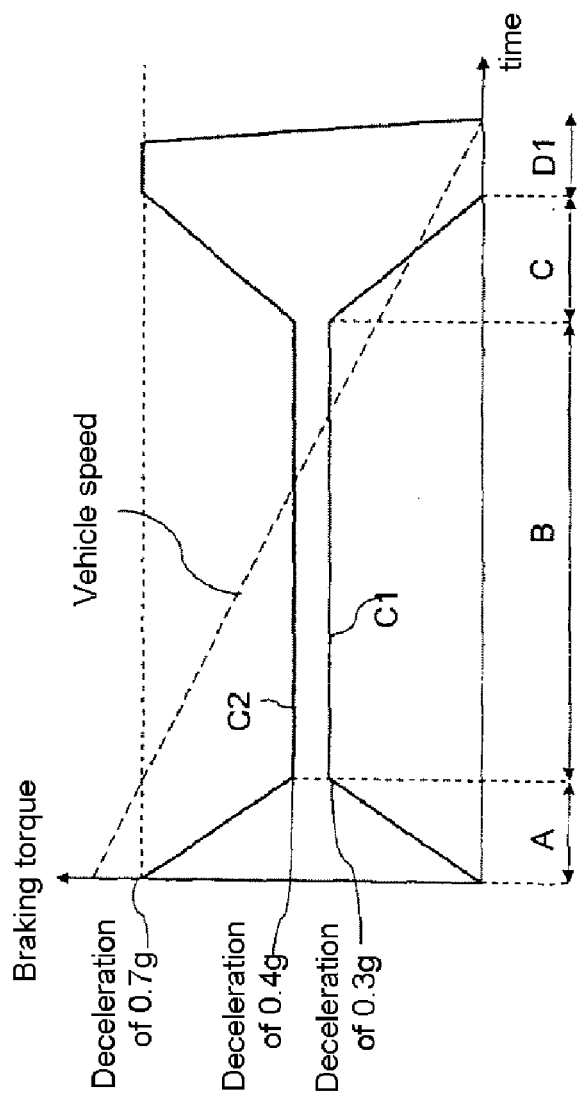

An overall exemplary embodiment of a braking system according to the invention will be described first of all with reference to FIG. 3.

This system comprises, in a way known per se, a brake booster 4 comprising a working chamber 41 and a vacuum chamber 40 which are separated by a brake servo membrane or piston 42 capable of moving along the axis of the booster 4. The movement of the piston 42 via a push rod 43 controls the movement of the pistons of a brake master cylinder 5. This master cylinder induces pressures in the vehicle braking circuit 6.

According to the invention, there is an intermediate hydraulic device that we shall call the hydraulic simulator 3 in the remainder of the description. A braking control device or brake pedal 1, which is actuated by the driver of the vehicle, controls the hydraulic simulator 3. The latter notably comprises a three-way valve 30 which is connected to the working chamber 41 by a pipe 32 and to the vacuum chamber by a pipe 33. This valve is able:

either to place the working chamber 41 in communication with the vacuum chamber 40 by causing the pipes 32 and 33 to communicate with one another. In this case, the pressures across the two sides of the piston 42 are substantially balanced and this piston remains immobile, or of isolating the working chamber 41 from the vacuum chamber 40 (this is a start-of-braking phase), or of placing the working chamber 41 in communication with the atmospheric air by isolating the pipe 32 from the pipe 33 and connecting it to the atmospheric air. A pressure difference is created between the vacuum chamber 40 and the working chamber 41. The piston 42 is urged to move towards the vacuum chamber (to the left in FIG. 3). The movement of the piston 42 has the effect of pushing the push rod 43 towards the brake master cylinder 5. The booster therefore supplies the brake master cylinder with a braking force.

In a system such as this, the brake pedal is thus mechanically uncoupled from the brake booster 4, from the brake master cylinder 5 and from the hydraulic braking circuit 6 of the vehicle.

By contrast, provision may be made for the hydraulic simulator 3 to be connected to the hydraulic circuit of the vehicle and, in particular, to one chamber of the master cylinder via a pipe 62. Under such conditions, transfers of brake fluid to the master cylinder without any change to the brake pedal and variations in pressure in the vehicle hydraulic circuit will be imparted at least in part to the hydraulic simulator 3, which will pass on these variations to the brake pedal via the rod 34. These transfers of brake fluid may be induced, for example, by an antilock braking system (ABS) or an electronic stability program (ESP).

These variations are therefore filtered towards the brake pedal, making it possible to improve driver comfort while at the same time allowing the driver better to monitor the state of the braking system.

Furthermore, the hydraulic simulator 3 may comprise an elastic element (not depicted in FIG. 3) between the brake pedal and the control of the three-way valve and which offers a force resisting the command to move the brake pedal, thus having the effect of simulating, for the driver's benefit, the braking forces exerted.

The system of the invention therefore comprises a three-way valve controlling the brake booster 4, but this three-way valve, unlike the three-way valves in the brake servos commonly used in the art, does not move under normal braking.

Furthermore, the primary piston of the master cylinder 5 is not connected to the three-way valve.

Finally, an elastic element located between the brake pedal and the control of the three-way valve performs a decoupling function to prevent any reaction from the braking circuit from being passed back directly to the brake pedal and to introduce a law governing the feedback of braking force to the brake pedal.

Because the position of the master cylinder is independent of the position of the brake pedal and because there is a simulating spring, the system of the invention makes it possible:

- to establish a law relating braking force to the position of the brake pedal. The relationship between the brake pedal travel, the force and the pressure in the braking circuit can then always be constant under normal operating circumstances,
- to filter disturbances from the hydraulic circuit (for example the vibrational hydraulic pulsation that occurs when the ABS system is in operation),
- to achieve insensitivity to major displacements of brake fluid, for example in large-sized brakes (large-diameter brakes and/or brakes with long travel) and to variations in absorption,
- to achieve insensitivity (or to reduce sensitivity) to transfers of volumes of brake fluid caused by a hydraulic unit, in one direction or the other, between the vehicle brakes and the master cylinder.

A more detailed description of an exemplary embodiment of a braking system according to the invention will now be given with reference to FIG. 4a. Those elements of FIG. 4a that perform the same function as those of FIG. 3 bear the same references thereas. The same will be true in respect of the other figures attached to this description.

This system comprises:
- a brake pedal 1 that can be controlled by the driver of the vehicle and used to actuate a hydraulic control device 2,
- the hydraulic control device 2 comprising a piston 20 controlled by the brake pedal and capable of pressurizing a chamber 21 in order to inject a pressurized fluid into a pipe 22,
- a hydraulic simulator 3 corresponding to the hydraulic simulator 3 of FIG. 3. This hydraulic simulator receives the pressure injected into the pipe 22 and, depending on its position, is able to control the operation of the brake booster 4. The construction and operation of this hydraulic simulator will be described in greater detail hereinbelow,
- the hydraulic brake booster or brake servo 4 comprising a vacuum chamber 40 (front chamber in most boosters) and a working chamber 41 (rear chamber) which are separated from one another by an axially mobile piston 42. A vacuum source 45 allows a vacuum to be created in the vacuum chamber 40. A movement of the piston 42 (to the left in FIG. 4*a*) causes a push rod 43 to move,
- a brake master cylinder 5 comprising pistons 50 and 50' the movements of which are controlled by the push rod 43,
- hydraulic braking circuits 6 capable of passing on the braking pressure to the vehicle wheel cylinder devices.

The hydraulic simulator 3 comprises an inlet chamber 31 to which the pipe 22 leading from the hydraulic control device 2 is connected. The inlet chamber 31 contains a piston 34 for operating the three-way valve 30.

The three-way valve 30 comprises an axially movable sensor spindle 301 which bears a sensor 302 (or piston plunger). This sensor comprises a seat known as the inlet seat which may, depending on its position, be in contact with a valve shutter 303. The valve shutter 303 may, depending in its position, be in contact with a valve seat 309. A spring 312 is able to push the sensor back to the right (in the figure) in the rest condition and a spring 311 is able to push the valve shutter 303 to the left.

The three-way valve 30 is connected:
- by one port 305, to atmospheric pressure,
- by one port 306 and a pipe 33 to the brake servo vacuum chamber 40,
- by a port 307 and a pipe 32 to the brake servo working chamber 41.

The hydraulic simulator 3 also possesses a simulation spring 310 located between the piston 34 and the moving sensor spindle 301. The purpose of this spring is to simulate, for the driver's benefit, a braking force and to determine a brake pedal travel. Compression of the spring 310 thus allows the brake pedal to move (to advance), thus simulating how a conventional brake system behaves.

Furthermore, the hydraulic simulator 3 has one port 308, connected by a pipe 62, to the braking circuits and allowing the pressure in the braking circuits to act on the sensor spindle 301.

The brake servo 4 is as described in conjunction with FIG. 3. It has a spindle 44 guiding the movement of the piston 42 and of the push rod 43. In addition, a vacuum source 45 allows a vacuum to be created or the pressure to be reduced in the vacuum chamber 40.

The brake master cylinder 5 is, for example, a tandem master cylinder supplied with brake fluid via a reservoir 53.

Figure 4A:
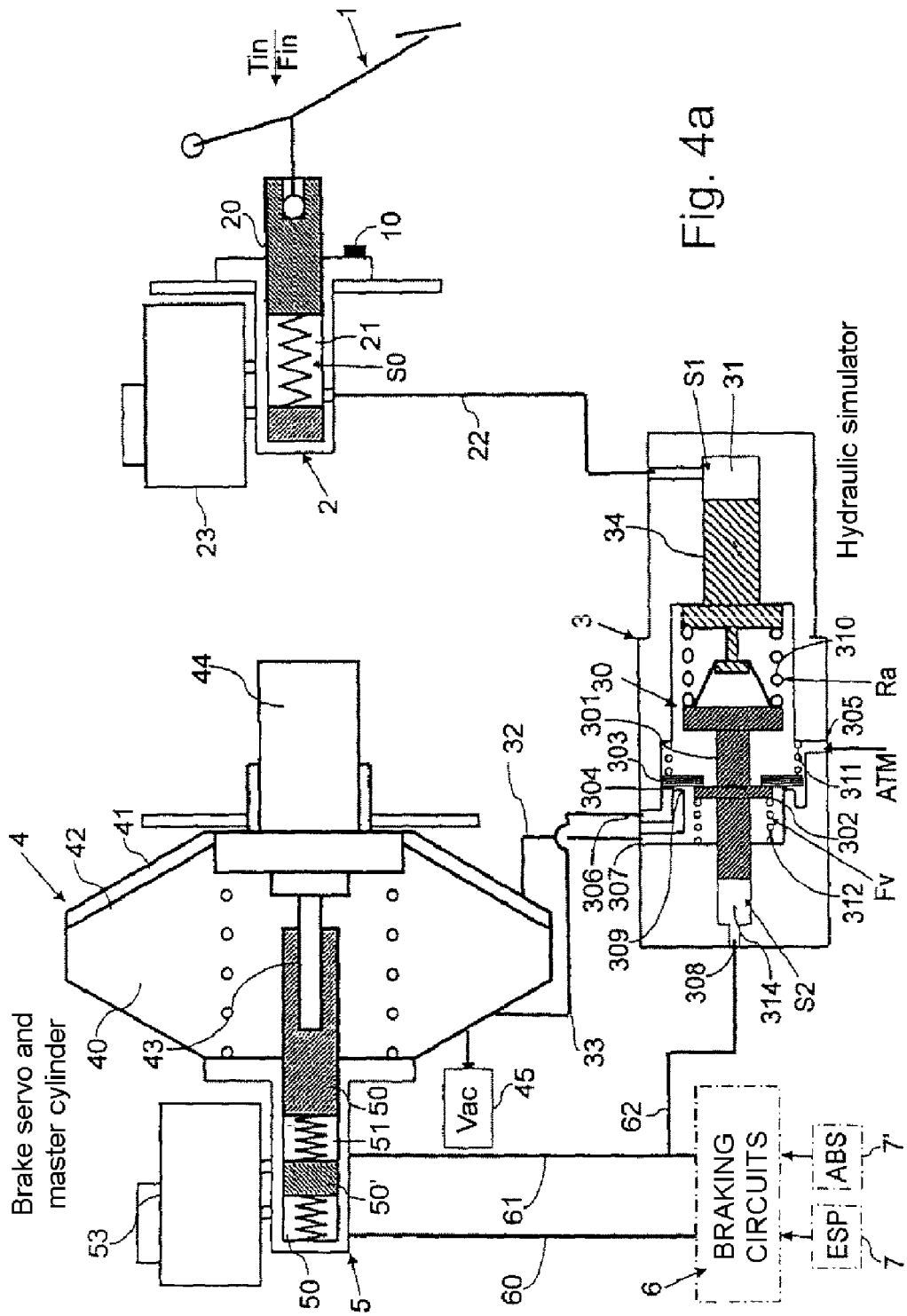
FIG. 4a: one exemplary embodiment of the brake circuit control system according to the invention.
Figure 4B:
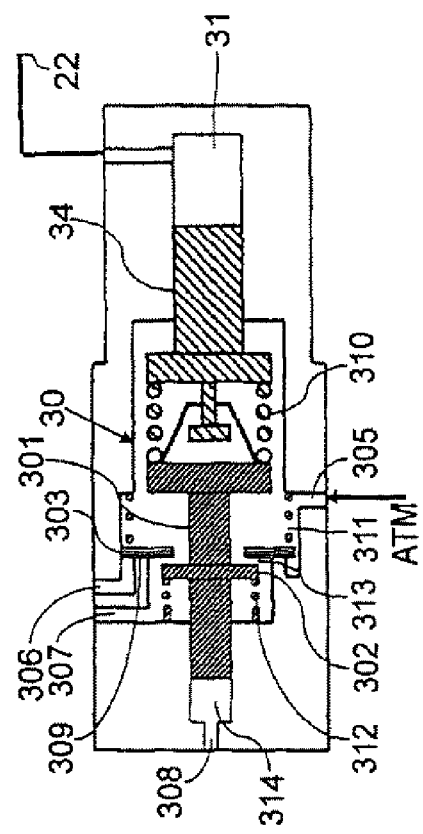
FIGS. 4b to 4d: various operating states of the hydraulic simulator of FIG. 4a, FIG. 5a: one exemplary embodiment of a hydraulic simulator according to the invention.

The braking circuits 6, symbolized in chain line in FIG. 4*a*, are connected to the master cylinder by pipes 60 and 61. The pipe 62 connects the pipe 61 to the simulator 3.

There are systems that act on the braking circuits and are connected thereto. These are, for example, an electronic stability program 7 (ESP) and an antilock braking system 7' (ABS).

The way in which the system of FIG. 4*a* works will now be described with reference to FIGS. 4*a* to 4*d* which depict various states of the hydraulic simulator 3 at various stages of operation.

When the driver is not depressing the brake pedal 1, the braking system is at rest. The hydraulic simulator is in the state depicted in FIG. 4*b*. The three-way valve 30 closes the vacuum chamber 40 in communication with the working chamber 41 via the pipes 32, 33, via the ports 306, 307 and via a passage symbolized as an internal port 304. Because the two chambers 40 and 41 are at the same pressure, no braking force is transmitted by the brake servo 4 to the brake master cylinder 5.

Figure 4C:
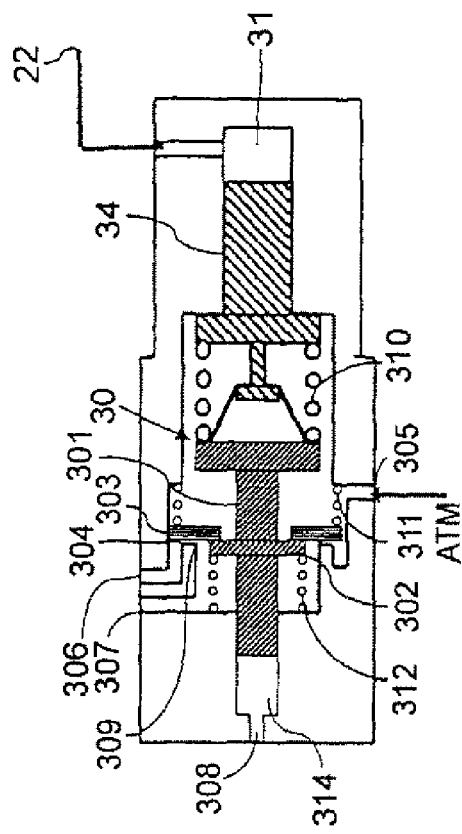

When the driver depresses the brake pedal 1, the piston 20 of the hydraulic control device 2 compresses the fluid (or gas) contained in the chamber 21. A pressure is conveyed along the pipe 22 to the inlet chamber 31 of the hydraulic simulator 3. This pressure causes the piston 34 to move and this piston presses on the sensor spindle 301 via the spring 310. The sensor 302 moves to the left (FIG. 4*c*). The valve shutter 303, pushed by the spring 311, also moves to the left and closes the port 304. Communication between the ports 306 and 307 is closed. The vacuum chamber 40 becomes isolated from the working chamber 41.

Figure 4D:
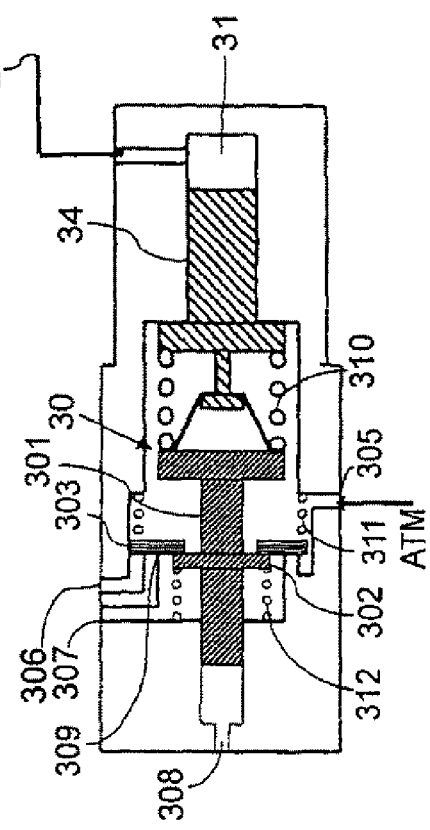

When the pressure in the inlet chamber increases, the piston 34 moves further to the left. The sensor spindle 301 and the sensor 302 also move to the left. As can be seen in FIG. 4*d*, the sensor 302 moves away from the valve shutter 303 and opens a communication port 313 between the ports 307 and 305. The working chamber 41 is therefore placed in communication with atmospheric pressure via the three-way valve of the hydraulic simulator.

The pressure in the working chamber 41 becomes higher than the pressure in the vacuum chamber 40. As a result, the piston 42 and the push rod 43 are driven to the left (see FIG. 4*a*). The push rod 43 pushes on the primary piston 50 causing an increase in pressure leading to movement of the secondary piston 50'. The master cylinder 5 induces a braking pressure in the pipes 60 and 61 and in the braking circuits 6.

Actuation of the brake pedal 1 has therefore allowed a brake command to be passed on to the brake servo 4 via the hydraulic simulator 3. In return, the brake servo 4 has commanded the creation of a braking pressure in the vehicle braking circuits.

It will be noted that, in the hydraulic simulator, the forwarding of the braking command from the brake pedal has been passed on via the spring 310. Setting the elasticity of this spring (its spring rate) makes it possible to simulate a braking force on the brake pedal. It is therefore possible to simulate, for the benefit of the driver, a reaction to a braking force that is similar to a reaction of a conventional braking system.

Furthermore, certain vehicles are equipped with systems capable of acting on the braking circuits of the vehicle. These are, for example, an antilock braking system 7' (ABS) and an electronic stability program 7 (ESP). It may be beneficial to provide the driver with the sensation that these systems are in operation so that the driver can be alerted to the fact that the vehicle may be reaching the limits of its stability on the road surface.

The system of the invention provides a pipe 62 connecting a pipe (61 for example) of the braking circuits to a port 308 of the braking simulator in order not only to balance the three-way valve but also, if needed, to apply a reaction felt on the brake pedal. This port communicates with a simulation chamber 314 in which one end of the sensor spindle 301 slides. The pressure of the brake fluid is thus applied to this end of the sensor spindle 301. This spindle is therefore subjected to the variations in pressure induced in the braking circuits and passes these variations on to the brake pedal.

In a system such as this, the sensor therefore seeks a balance between the rise in pressure P1 in the inlet chamber 31 of the hydraulic simulator and the rise in pressure P2 in the simulation chamber 314.

In general, in a boosted braking system, the boost ratio is given by the ratio $$1/S = P/F$$

where:
F represents the force applied to the control rod,
P represents the braking pressure supplied by the brake master cylinder.

In the system of FIG. 4a, the braking force Fin applied by the brake pedal applied to the control rod of the piston 20 is passed on by the chamber 21 of the hydraulic control device and the inlet chamber 31 of the hydraulic simulator 3. If:
S0 denotes the cross section of the chamber 21,
S1 denotes the cross section of the inlet chamber 31,
S2 denotes the cross section of the simulation chamber 314,
then the theoretical boost ratio is given by the ratio:

$$S1/S0 \cdot S2.$$

The input force Fin applied to the control rod of the piston 20, if friction is disregarded, is given by the formula (refer to FIG. 4a):

$$F\text{in} = Ra \cdot T\text{in} \cdot S0^2/S1^2$$

in which
Ra is the stiffness of the spring 310 (expressed in N/m),
Tin is the travel of the control rod of the piston 20,
S0 is the cross section of the chamber 21,
S1 is the cross section of the chamber 31.

Referring still to FIG. 4a and disregarding friction, the pressure Pmc in the brake master cylinder is a function of the force on the brake pedal. This pressure can be expressed using the following relationship:

$$PMC = [(Ra \cdot T\text{in} \cdot S0/S10 - Fv]/S2$$

in which:
PMC is the pressure in the master cylinder 5,
Ra is the stiffness of the simulating spring 310,
Tin is the travel of the control rod of the piston 20 (and therefore of the piston 20 itself),
S0 is the cross section of the chamber 21,
S1 is the cross section of the chamber 31,
S2 is the cross section of the chamber 314,
Fv is the load on the sensor spring 312 when the sensor is in a state of equilibrium.

It can therefore be seen that, in the system of the invention, an elastic element situated between the brake pedal and the control of the three-way valve performs a decoupling function to prevent reactions from the braking circuits from being fed back directly to the brake pedal and to create a law governing the feedback of braking force to the brake pedal. At any moment, the three-way valve is controlled by a balance of the forces:
driving force which is a function of the force exerted on the brake pedal,
and pressure in the master cylinder (or in the hydraulic braking circuit).

The designer is therefore free to choose the most suitable master cylinder (for example one with a large volume and/or with a large travel). A system such as this can make up for a malfunction such as, for example, the presence of air in the hydraulic braking circuit, the travel of the brake pedal then being lengthened in order to achieve equilibrium.

In addition, as was already mentioned before, the three-way valve 3 can be used to control the brake booster 4 but under normal braking circumstances does not move, by contrast with that which happens with brake boosters known in the art.

Furthermore, the primary piston of the master cylinder 5 is not connected to the three-way valve.

Figure 5A:
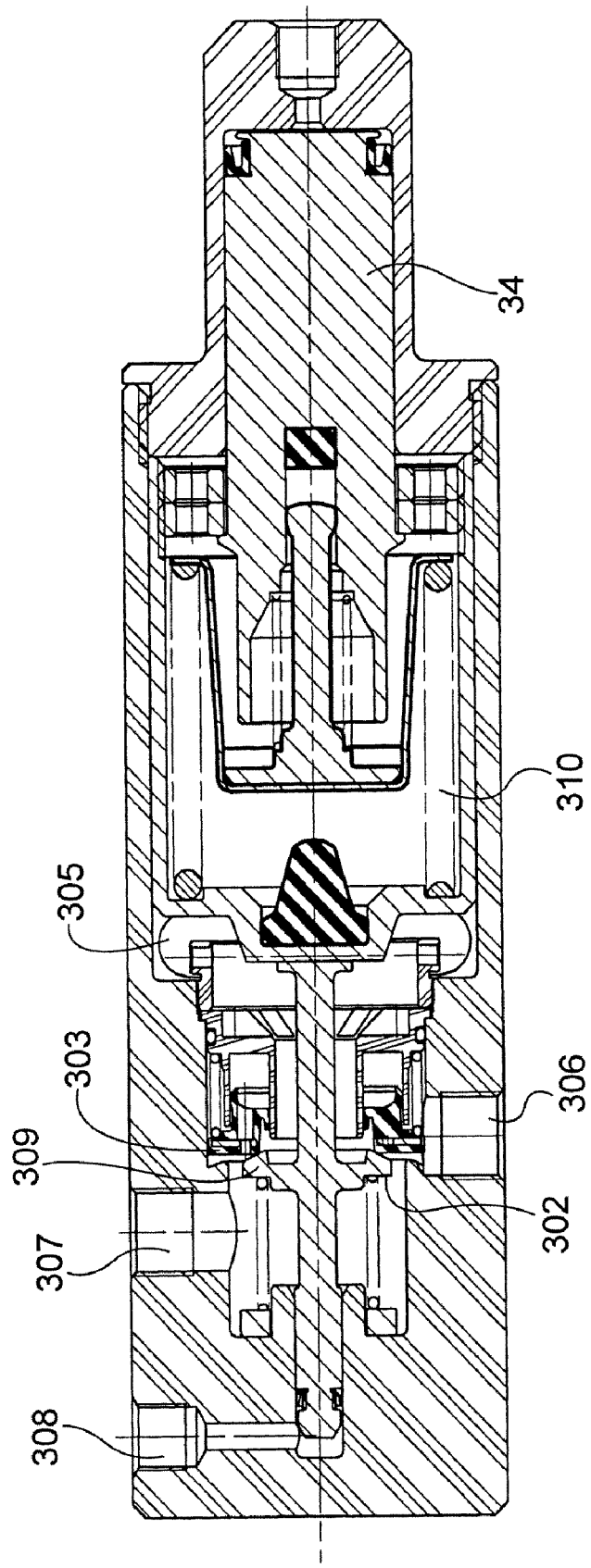
FIG. 5b: a brake circuit control system incorporating the hydraulic simulator of FIG. 5a, FIG. 6: an alternative form of embodiment of the brake circuit control system of FIG. 4a, FIG. 7a: an alternative form of embodiment of the brake control system according to the invention.

FIG. 5a depicts one exemplary embodiment of a hydraulic simulator 3 according to the invention. This again shows:
the input piston 34,
the simulation spring 310,
the sensor 302,
the valve shutter 303,
the valve seat 309,
the ports 306 and 307 leading respectively to the vacuum chamber and to the working chamber and the port 305 for venting to atmospheric pressure,
the port 308 for returning braking pressure to the hydraulic simulator.

Figure 5B:
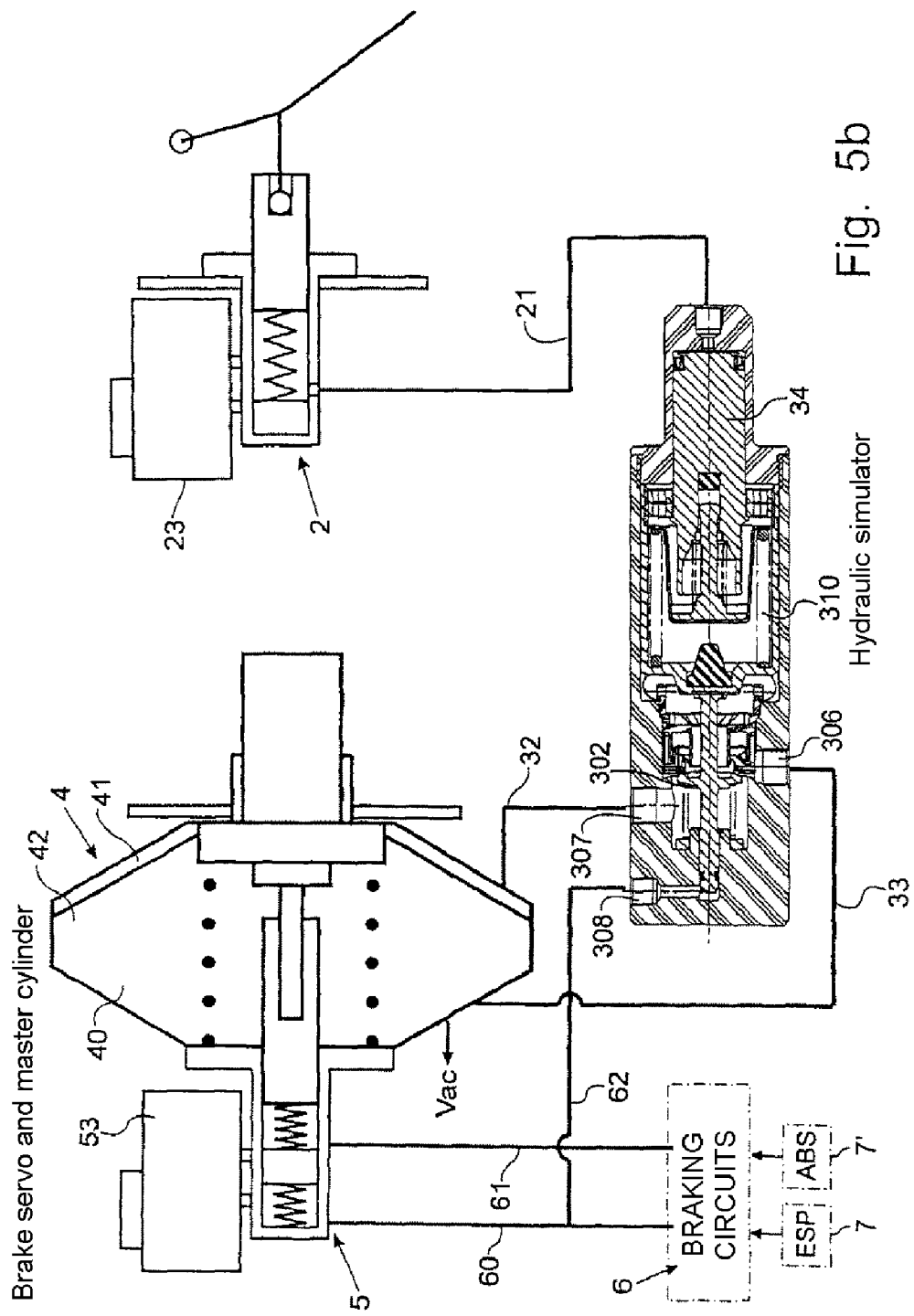

The simulator of FIG. 5a is set up as depicted in FIG. 5b by connecting the pipes 21, 32, 33 and 62 in accordance with FIG. 4a.

Figure 6:
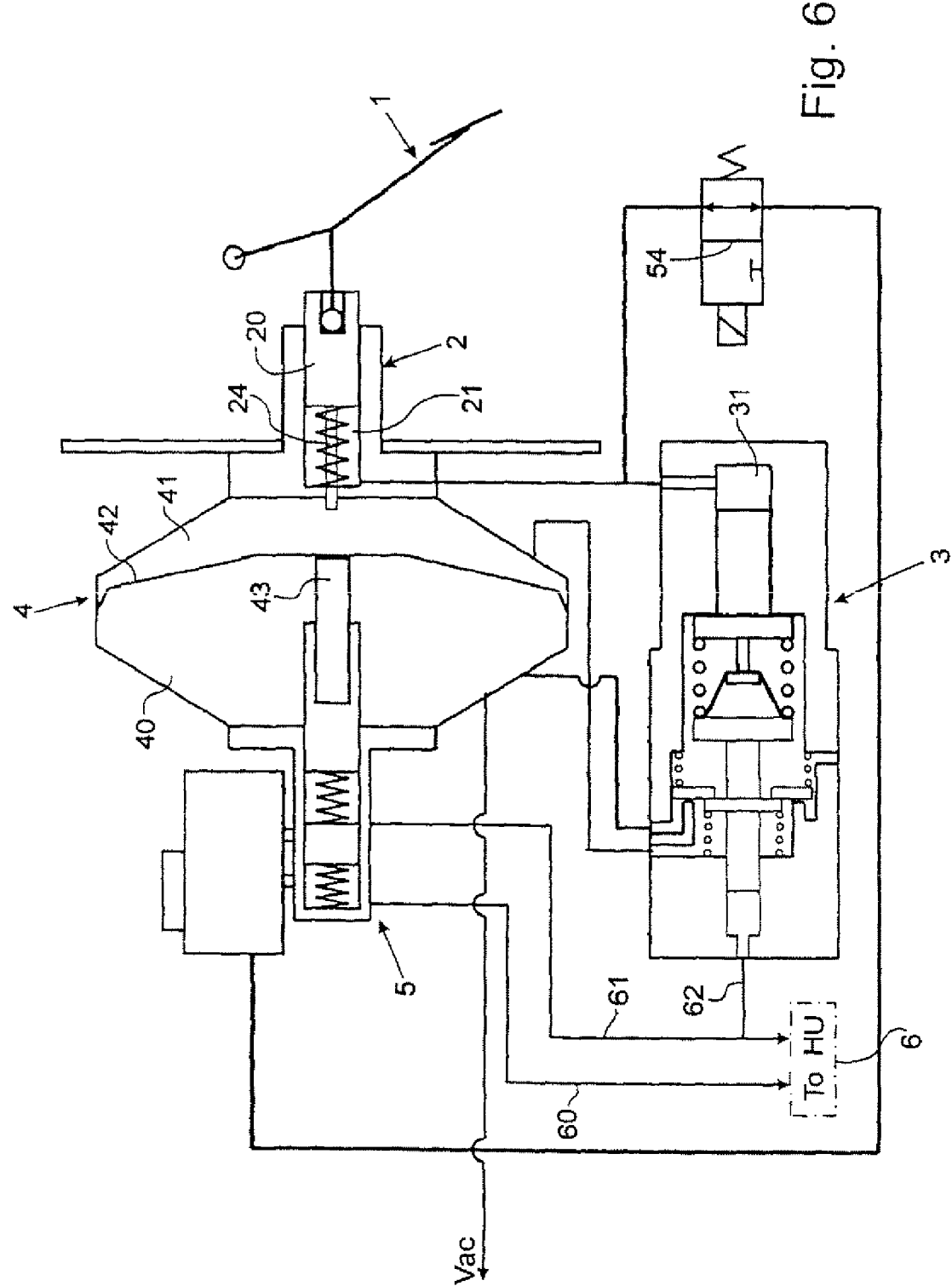

FIG. 6 depicts one embodiment of the system of FIG. 4a in which the hydraulic control device 2 is incorporated into the brake servo 4.

The hydraulic simulator 3 is produced in a similar way to that which was described above. It contains the same elements which will therefore not be described again.

The hydraulic control device 2 is positioned along the axis of the brake servo 4. It has a control rod 24 which enters the working chamber 41. One end of this control rod lies a short distance away from the piston 42 and from the push rod 43. This set up means that in the event of failure of the hydraulic simulator and/or of the brake servo, pressure can be applied directly or almost directly (via the piston 20 and the control rod 24) on the push rod 43.

The chamber 21 of the piston 20 of the control device 2 and the inlet chamber 31 of the hydraulic simulator may be filled with a fluid which may be the vehicle brake fluid. These chambers are then supplied with brake fluid via a valve 54 connected to the brake fluid reservoir. When not under braking, the valve 54 is open and brake fluid from the reservoir is fed to the chambers and 31. Under braking, the valve 54 is closed and the chambers 21 and 31 are isolated from the brake fluid reservoir.

An alternative form of embodiment of the system of the invention will now be described with reference to FIG. 7a. As already mentioned previously, elements in this FIG. 7a which perform the same functions as in the other figures bear the same references.

In this alternative form of embodiment, the brake simulator 3 is incorporated into the brake servo 4. In addition, the piston 34 controlling the sensor 302 is controlled directly by the brake pedal but could, without departing from the scope of the invention, be controlled by a control device such as 2 in FIG. 4a.

The hydraulic simulator 3 again contains the simulation spring 310, the sensor spindle 301, the sensor 302, the valve shutter 303, the valve seat 309, the port 305 for venting to atmospheric pressure. Only the ports 306 and 307 to the vacuum chamber 40 and to the working chamber 41 respectively may appear different, but the way in which the hydraulic simulator works is the same as in FIG. 4a under normal operating conditions.

Figure 7A:
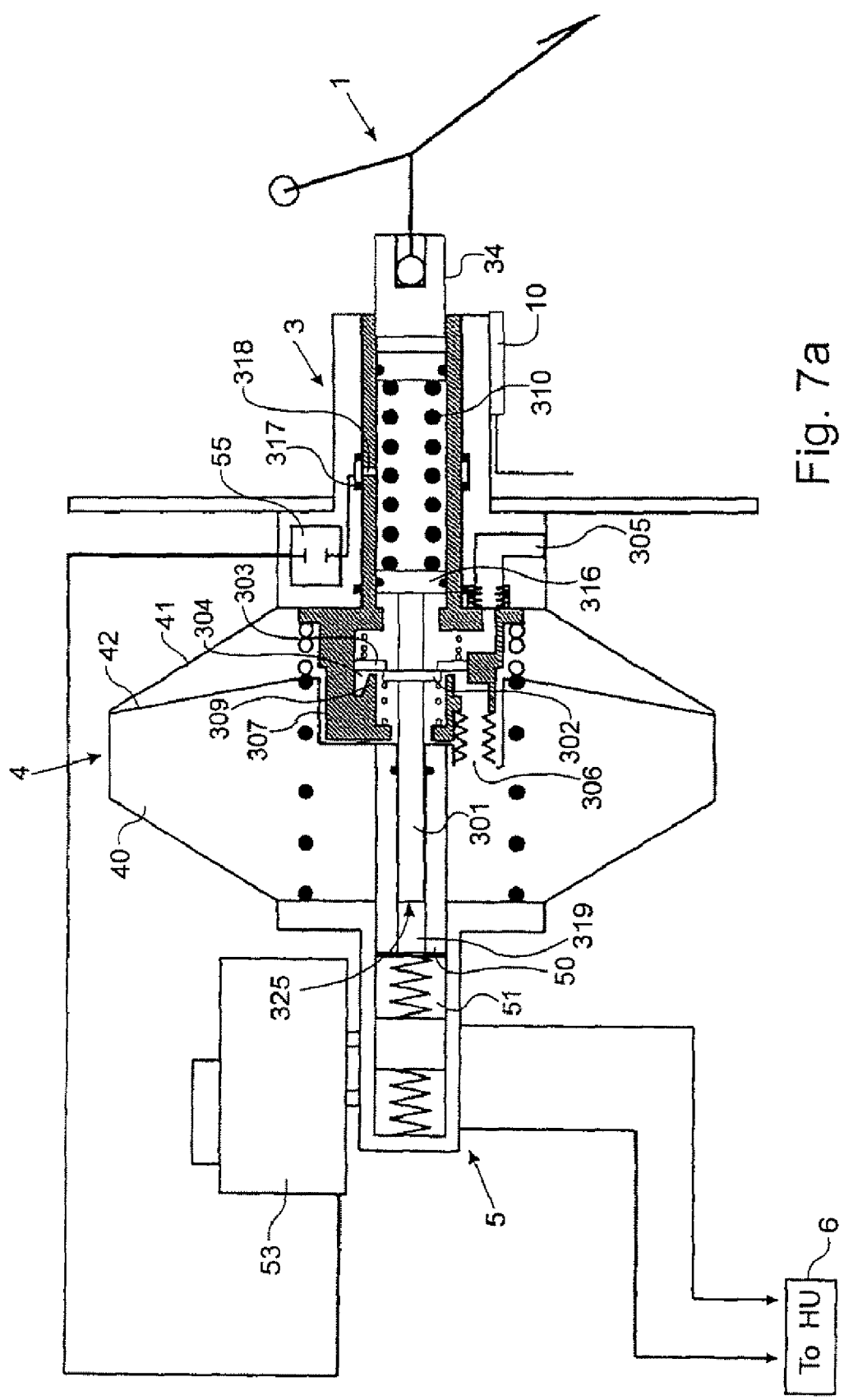

At rest, in the absence of a braking command, the system is in the state depicted in FIG. 7a. The working chamber 41 is placed in communication with the vacuum chamber 40 via the port 307 and the port 304.

Figure 7B:
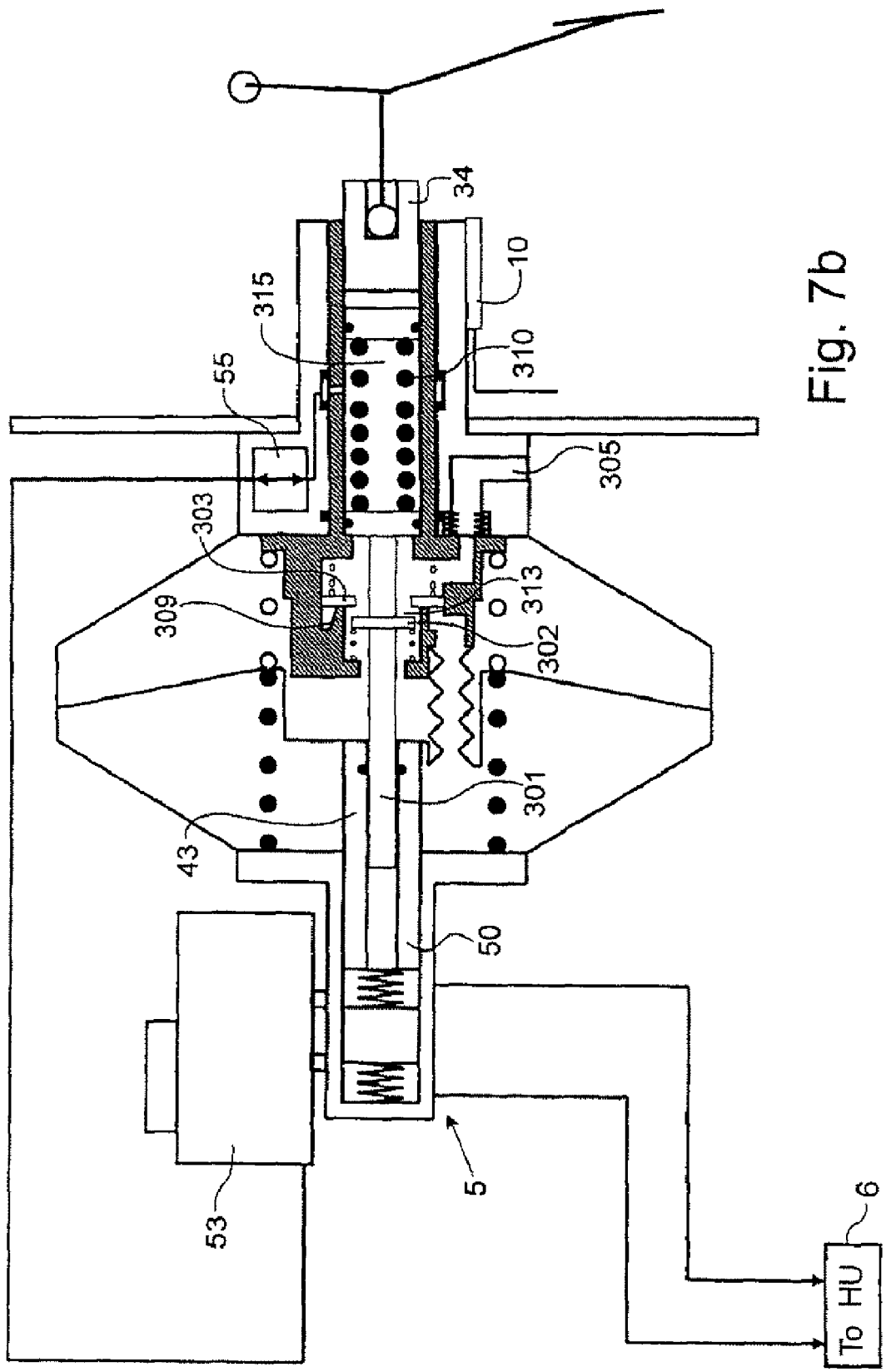

When the driver depresses the brake pedal, the operation is as follows, as illustrated in FIG. 7b:
- the piston 34 moves to the left,
- it transmits a force of movement towards the left, via the spring 310, to the sensor spindle 301,
- the sensor 302 moves to the left,
- the valve shutter 303 is pressed against the valve seat 309,
- the sensor 302 separates from the valve shutter 303 and opens a passage 313 allowing the working chamber 41 to communicate with the port 305,
- the working chamber 41 is connected to atmospheric pressure,
- the piston 42 moves to the left,
- a braking force is applied, to the left, to the piston of the master cylinder 5. In the advantageous exemplary embodiment illustrated in FIG. 7a, a one-piece part acts both as push rod (push rod 43 in FIG. 4a) and as piston 50.

In this operation, it can therefore be seen that the hydraulic simulator 3 has allowed a braking force to be transmitted from the brake servo to the master cylinder without a control rod being in mechanical contact (even indirectly) with the push rod actuating the master cylinder piston. Control of the brake pedal is therefore mechanically decoupled from the brake servo and from the master cylinder.

The brake pedal is therefore at least partially decoupled from the effects resulting from operation of the brake servo and of the braking circuit. In particular, the valve seat 309 belongs to a part which does not move under normal braking operation. However, the sensor spindle 301 slides in a hole 319 in the piston 50 of the master cylinder. The end 325 of the spindle 301 is subjected to the pressure obtaining in the master cylinder chamber 51. As already described earlier, the three-way valve of the simulator is therefore controlled by a balancing of the forces:
- driving force which is a function of the force exerted on the brake pedal,
- and pressure in the master cylinder.

The system of FIGS. 7a and 7b may also possess a valve 55 which is connected to the brake fluid reservoir 53 and which allows the space 315 in which the piston 34 slides to be supplied with brake fluid.

At rest (under no braking), this valve 55 is closed. Under braking, it is open (except in the event of failure as will seen hereinafter). The brake fluid contained in the space 315 works in concert with the spring 310 to transmit a feeling of braking to the brake pedal.

What the invention specifically does is to make provision for the diameter of the communicating hole 318 that allows the valve 55 to communicate with the space 315 to be sized in such a way as to limit flows of fluid from the space 315 towards the valve 55. In this way, the feeling of braking fed back to the brake pedal is modified, particularly when the driver is depressing the brake pedal quickly.

However, provision may equally be made for the valve 55 to close when, for example, the driver depresses the brake pedal suddenly, thus allowing the brake command to be transmitted directly (or almost directly) to the sensor 302, this reducing the travel of the brake pedal.

Finally, as will be described hereinafter, a seal 317 can be used to isolate the space 315 from the valve 55 in the event of failure.

Figure 7C:
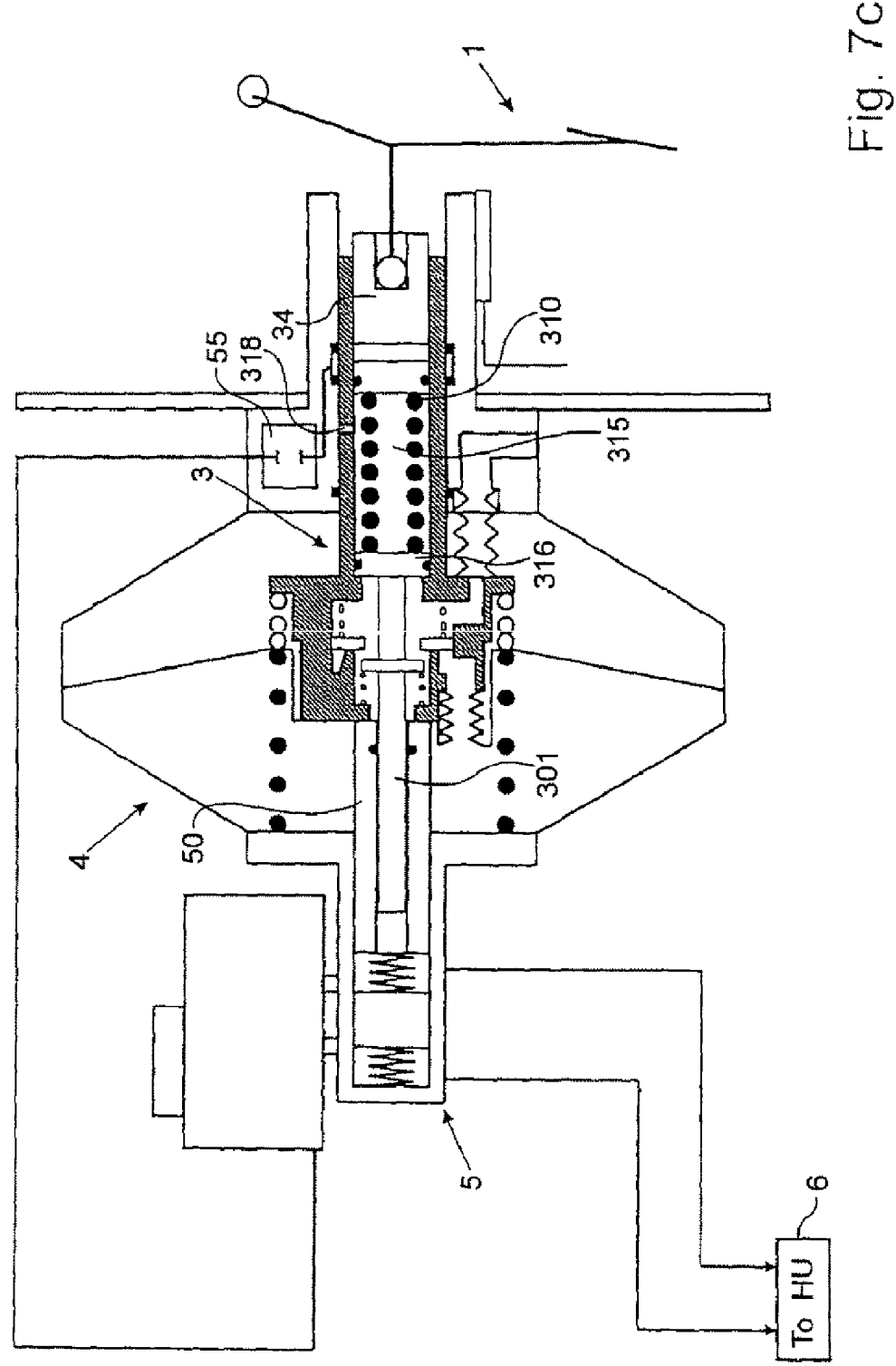

FIG. 7c illustrates how the system operates if the brake servo and/or the hydraulic simulator should fail.

In the event of failure, the lack of braking causes the driver to apply more force to the brake pedal than he would under normal braking. A shoulder 316 on the sensor spindle 301 is driven to the end of its travel and finds itself in abutment against the assembly piece of the hydraulic simulator. The hydraulic simulator 3 is then driven to the left and presses against the master cylinder piston 50 (or the push rod that acts on the master cylinder piston). Unboosted braking is thus provided.

As can be seen in FIG. 7c, the port 318 which normally allows communication between the space 315 and the valve 55 is closed. A seal 317 hermetically isolates this port 318 as the piston 34 advances, which corresponds to defective operation of the brake servo. Thus, as soon as the piston 34 has moved past the port 318 and shut it off, the brake fluid present in the space 315 and compressed by the piston 34 causes the valve spindle 301 and/or the piston 50, together with any intermediate components, to move to the left.

Alternatively, in a similar manner to that which is depicted in FIG. 6, provision may be made for the sensor spindle 301 to push on the master cylinder piston 50 via its left-hand end.

The action of the seal 317 may be supplemented or replaced by closing of the valve 55.

It will be noted that in this defective operation, the valve 55 is advantageously closed so as to pass on to the master cylinder piston as much as possible of the braking force applied to the brake pedal.

Figure 8A:
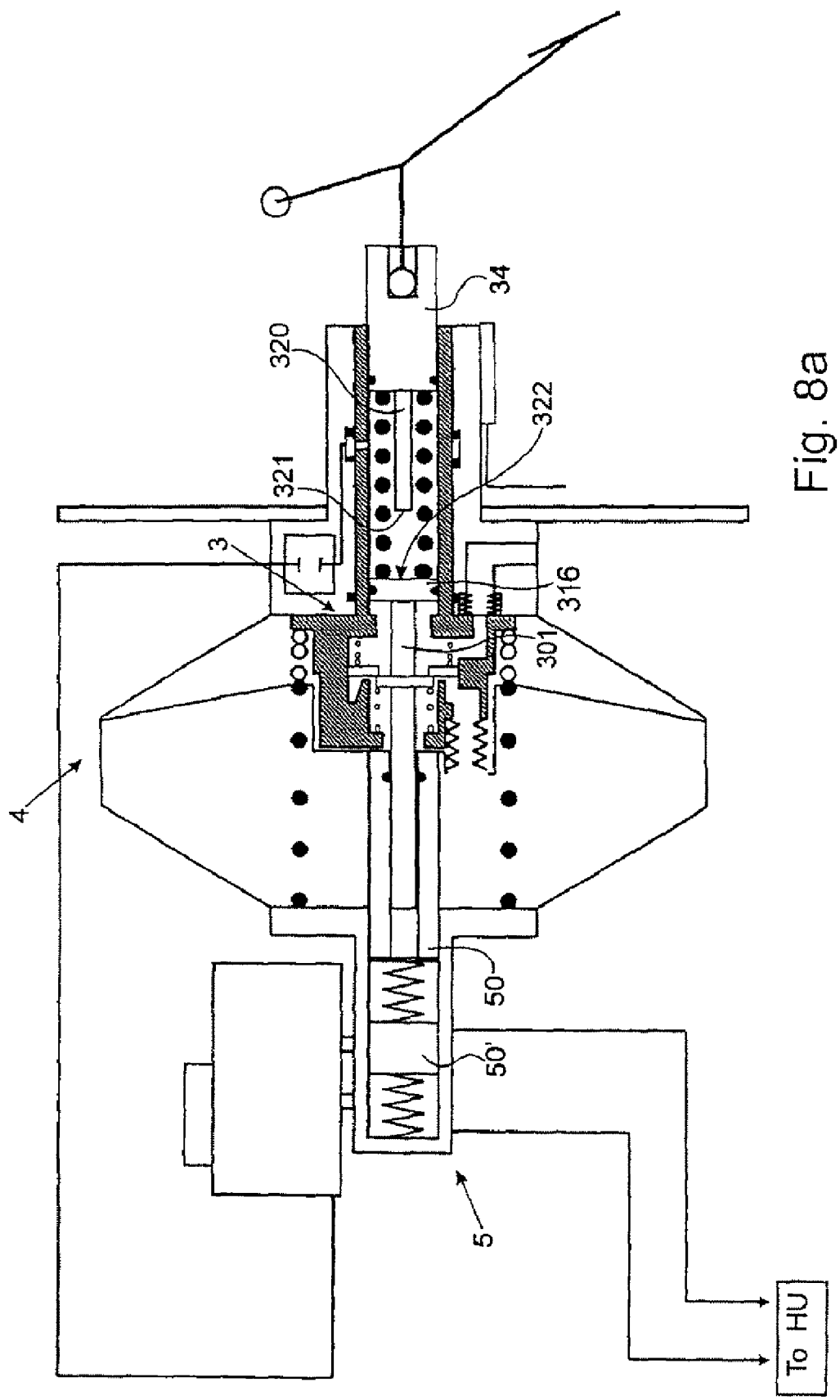
Figure 8B:
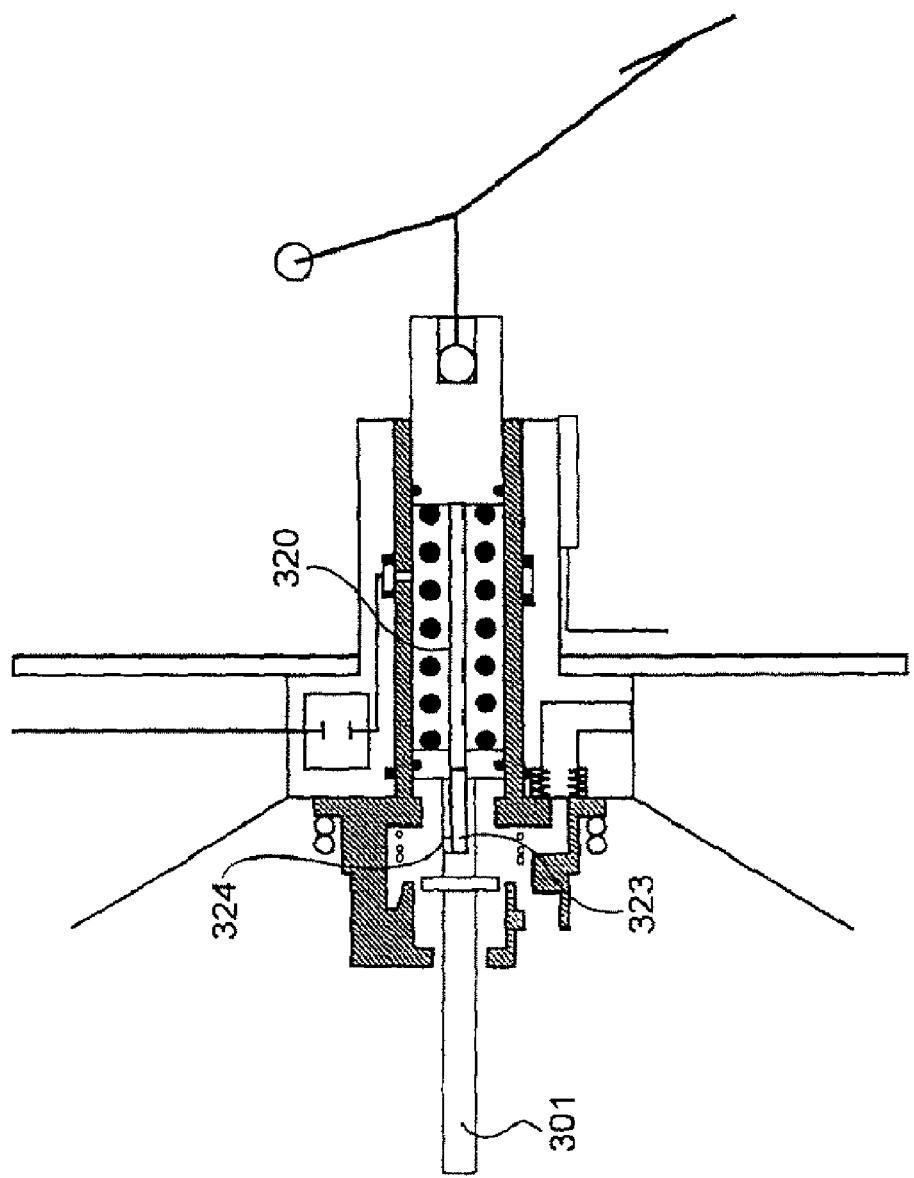

FIGS. 8a and 8b depict alternative forms of embodiment of the system of FIG. 7a in which the piston 34 comprises an axial rod 320 located between the piston 34 itself and the sensor spindle 301. The distance between the end 321 of the rod 320 and the face 322 of the rod 301 corresponds to normal braking operation of the simulator and of the brake servo 4. Should the simulator or the brake servo fail, the driver will depress the brake pedal so that the end 321 of the rod 320 comes into contact with the face 322. The force applied to the brake pedal will then be passed on directly to the sensor spindle 301. The shoulder 316 of the sensor spindle is pushed to the end of its travel until it comes into abutment against the assembly piece of the hydraulic simulator. The hydraulic simulator 3 is driven to the left and presses against the master cylinder piston 50 (or against the push rod which acts on the master cylinder piston). Unboosted braking is thus provided by the rod 320.

FIG. 8b depicts an alternative form of embodiment of the system of FIG. 8a in which the rod 320 slides in an axial hole 323 in the sensor spindle. This rod 320 is therefore guided in the hole 323. In order to allow the rod 320 to slide freely and thus allow it to come into contact with the end of the hole 323 in the event of failure, a hole 324 may be provided that allows the end of the hole 323 to communicate with the outside of the hole 323. Alternatively, it is equally possible to provide a longitudinal spline along the periphery of the rod 320 to allow any air in the end of the hole 323 to escape.

According to an alternative form of embodiment, the function of the hydraulic unit comprising the brake servo may be omitted, or a hydraulic pump substituted for it.

For example, the maximum saturation pressure in the master cylinder may be detected and when detected a hydraulic pump started up to inject additional pressure into the braking circuit. An arrangement such as this would, for example, enable the size of brake servo to be reduced.

It is also possible to provide various types of sensor for detecting the travel of the brake pedal or of the simulator sensor, together with pressure and vacuum sensors.

According to another alternative form of embodiment of the invention, it is therefore advantageously possible to envisage detecting the movements of the brake pedal using, for example, a brake pedal position transducer 10. Alternatively, a transducer such as this may be used to detect the movements of the piston 34.

Information regarding the position of the brake pedal (or of the piston 34) may correspond to a downgrading in the effectiveness of the braking system and this fact may be communicated to the user. It is therefore possible to provide feedback of the feel of the brakes to the brake pedal using an active system (for example electromagnetic). Information regarding the position of the brake pedal (or of the piston 34) may also be communicated to the electronic stability program (ESP) so that it can act accordingly. As far as feedback of the feel of braking to the brake pedal is concerned, it is possible to provide a rod which enters and slides in the simulator and which receives the variations in pressure induced in the braking circuit of the vehicle. Provision is then made for this rod to be coupled mechanically (either directly or indirectly) to the brake pedal so that this pedal can perceive the movements of this rod. The transmission ratio for the brake feel may be set by adjusting the friction with which this rod moves.

It is also possible, according to another alternative form of embodiment, to provide a braking verification loop using sensors that sense the movements of the wheels for example.

According to another alternative form it is also possible to provide for the front chamber (vacuum chamber 40 in the figures) to be placed at a pressure higher than that of conventional brake servos (higher than atmospheric pressure for example) and for the rear chamber (the working chamber 41 in the figures) to be placed at a raised pressure.

As far as the vacuum source is concerned, provision may be made for it to be achieved via the vehicle engine exhaust. However, it may comprise an electric pump or an engine-driven pump.

In conventional brake servos, there is a vacuum source which tends to create a vacuum in the vacuum chamber (front chamber) while the working chamber (rear chamber) is placed at atmospheric pressure under braking. In the system of the invention, it is also possible to provide a raised-pressure source connected to the working chamber in order to improve the way in which the brake servo works.

In the invention, this arrangement makes it possible to improve the effectiveness of the brake servo or reduce its diameter for the same effectiveness.

The system of the invention allows the simulation spring (310) to be actuated via a hydraulic control circuit.

It also allows mechanical actuation of the simulation spring incorporated into the command. It is therefore possible to isolate the chamber of the simulator using a mechanical-hydraulic device.

It is possible to combine an electromagnetic control coil with the system in order to reduce the pressure in the master cylinder, it then being possible for the system to operate at least partially in active mode under electrical control.

Furthermore, it is possible to achieve dual-gradient operation.

The system of the invention has several advantages including the following:

The system of the invention makes it possible to decouple, at the brake pedal, the braking force exerted from the feeling of braking felt as feedback by the driver. It is therefore possible to filter out disturbances originating from the hydraulic circuit (for example the vibrational hydraulic pulsing that is produced when an ABS system cuts in) and to achieve insensitivity to large displacements of brake fluid caused, for example, by a hydraulic unit, in one direction or the other, between the vehicle brakes and the master cylinder.

The force applied to the brake pedal by the driver can be only partially passed on, particularly if the brake pedal is actuated quickly. It is possible to establish a law of "braking force with respect to the position of the brake pedal". However, it is also possible, if the brake pedal is actuated quickly, to provide a function that assists with emergency braking.

Furthermore, according to the invention, operation of the master cylinder is mechanically decoupled from the brake pedal. In the alternative forms of embodiment in which the hydraulic simulator is incorporated into the brake servo, the valve seat 309 does not move under normal operating conditions. Thus, it is natural for the air that drives the brake servo piston 42 to be drawn from the engine compartment, thus reducing cabin noise. In addition, the spring 310 of the three-way valve filters out instabilities which, in a conventional brake servo, give rise to vibrations and undesirable noise. The noise of fluctuation of the sensor that is normally perceived with the three-way valve of conventional brake servos can therefore not be heard in the cabin of the vehicle.

The system of the invention also allows the characteristics associated with the operation of the brake pedal (the travel/pressure characteristic) to be adjusted and for this adjustment to be made independently of the absorption of the braking system.

Moreover, the system of the invention is a system free of electrical control and therefore exhibits good robustness.

In addition, the system of the invention operates practically immediately without any lag associated with the operation of electronic circuits.

The device according to the invention therefore allows the length of brake pedal travel to be dissociated from the travel of master cylinder pistons. It is thus possible, independently, to optimize:

Operation in normal mode, that is to say, for example, with braking boosted and with a short brake pedal travel, and operation in degraded mode, that is to say, for example, without boosting. For example, a master cylinder piston diameter may be chosen that is small enough that the force that has to be exerted on the brake pedal is acceptable and corresponds to a long travel only in the failure mode.

Applications:

The invention can be applied to vehicles equipped:

with internal combustion engines, with electric motors equipped with recuperative electric braking systems, both internal combustion engines and electric motors (hybrid vehicles).

It can be applied both to lightweight vehicles and to heavy goods vehicles. The diameter of the simulator piston will be defined according to the mass of the vehicle that is to be braked. It will be chosen small enough to be able to meet the requirements of emergency braking.

The invention claimed is:

1. Brake control system for a motor vehicle comprising a brake pedal (1), a brake booster (4) which comprises a front chamber (40) and a rear chamber (41) which are separated by a booster piston (42), the booster (4) supplying an amplified braking command dependent on the pressure difference between the two chambers, a brake master cylinder (5) receiving the amplified braking commands from the brake booster (4), characterized in that the brake control system comprises a simulator (3) not mechanically coupled to the piston (42) of the brake booster (4), the simulator receiving at least one braking command from the brake pedal (1) and in return one of establishing and controlling a pressure difference between the front chamber (40) and the rear chamber (41) of the brake booster so as to control the movement of the booster piston (42), and in that the brake booster (4) does not have a piston equipped with a three-way valve secured to the booster piston (42), the simulator (3) including a piston (34) receiving the at least one braking command from the brake pedal, a sensor spindle (301) separate from the piston (34) and operable to control a three-way control valve, and an elastic simulation element (310) transmitting forces between the piston (34) and the sensor spindle (301).

2. Brake control system according to claim 1, characterized in that the simulator is a hydraulic simulator.

3. Brake control system according to claim 2, characterized in that the piston is subjected to two opposing actions, firstly a braking command from the simulator and secondly a reaction force exerted by the elastic simulation element (310), the sensor spindle being operable to sense the ingress of one of air liquid into a one of a pneumatic and a hydraulic brake booster.

4. Brake control system according to claim 3, characterized in that the elasticity of the elastic simulation element (310) is set so that a force simulating braking force is transmitted to the brake pedal.

5. Brake control system according to claim 4, characterized in that the elastic simulation element (310) is a spring.

6. Brake control system according to claim 2, characterized in that the hydraulic simulator (3) comprises a three-way valve (30) capable of:
  placing the rear chamber (41) in communication with the front chamber (40),
  or of isolating the rear chamber (41) from the front chamber (40),
  or placing the rear chamber (41) in communication with a pressure source that establishes a pressure difference between the front chamber and the rear chamber.

7. Brake control system according to claim 1, characterized in that the brake control system comprises a hydraulic connection between, firstly, at least one of the inside of the master cylinder and any point on the hydraulic circuit of the vehicle and, secondly, the simulator (3) so that forces corresponding to variations in pressure in at least one of the master cylinder and the hydraulic circuit are passed on to the brake pedal.

8. Brake control system according to claim 6, characterized in that the three-way valve comprises a sensor (302) able to move under the action of the control piston (34), a valve shutter (303) able to move under the action of the sensor (302), and a fixed valve seat (309) against which the valve shutter (303) can bear.

9. Brake control system according to claim 8, characterized in that the brake control system comprises an intermediate hydraulic control device (2) controlled by the brake pedal (1) and passing on braking forces by inducing pressures in a hydraulic circuit (22, 31) so as to control the movement of the control piston (34) of the hydraulic simulator (3).

10. Brake control system according to claim 1, characterized in that the simulator (3) has a port (308) connected to at least one of a braking circuit (6) and the brake master cylinder (5).

11. Brake control system according to claim 10, characterized in that pressure in the at least one of the braking circuit (6) and the brake master cylinder (5) acts on the sensor spindle (301).

12. Brake control system according to claim 1, characterized in that the brake booster (4) and the brake master cylinder (5) are not mechanically coupled to the brake pedal (1).

13. Brake control system for a motor vehicle comprising a brake pedal (1), a brake booster (4) which comprises a front chamber (40) and a rear chamber (41) which are separated by a booster piston (42), the booster (4) supplying an amplified braking command dependent on the pressure difference between the two chambers, a brake master cylinder (5) receiving the amplified braking commands from the brake booster (4), the brake master cylinder (5) not being mechanically coupled to the brake pedal (1), characterized in that the brake control system comprises a simulator (3) not mechanically coupled to the piston (42) of the brake booster (4), the simulator receiving at least one braking command from the brake pedal (1) and in return establishing or controlling a pressure difference between the front chamber (40) and the rear chamber (41) of the brake booster so as to control the movement of the booster piston (42), and in that the brake booster (4) does not have a piston equipped with a three-way valve secured to the booster piston (42), the simulator (3) having a port (308) connected to at least one of a braking circuit (6) and the brake master cylinder (5) so that forces corresponding to variations in pressure in at least one of the braking circuit (6) and the brake master cylinder (5) are passed on to the brake pedal through the simulator (3).

14. Brake control system according to claim 13, characterized in that the simulator (3) includes a sensor spindle (301), pressure in the at least one of the braking circuit (6) and the brake master cylinder (5) acting on the sensor spindle (301).

15. Brake control system according to claim 14, characterized in that the simulator (3) includes a hydraulic piston separate from the sensor spindle (301) and an elastic simulation element (310) transmitting forces between the hydraulic piston and the sensor spindle (301), the hydraulic piston being subjected to a braking command from the simulator (3) and an opposing reaction force exerted by the elastic simulation element (310).

16. Brake control system according to claim 15, characterized in that the elasticity of the elastic simulation element (310) is set so that a force simulating braking force is transmitted to the brake pedal.

17. Brake control system according to claim 16, characterized in that the elastic simulation element (310) is a spring.

18. Brake control system according to claim 13, characterized in that the simulator (3) is a hydraulic simulator.

* * * * *

UNITED STATES PATENT AND TRADEMARK OFFICE
CERTIFICATE OF CORRECTION

PATENT NO. : 8,303,048 B2
APPLICATION NO. : 12/160436
DATED : November 6, 2012
INVENTOR(S) : Chris Anderson and Raynald Sprocq Page 1 of 1

It is certified that error appears in the above-identified patent and that said Letters Patent is hereby corrected as shown below:

On the Title Page, Item [56] a Foreign Application Priority Data section should read
"January 10, 2006 (FR) .... 0600210" and "January 10, 2006 (FR) .... 0600211"

Signed and Sealed this
Thirtieth Day of July, 2013

Teresa Stanek Rea
*Acting Director of the United States Patent and Trademark Office*